United States Patent [19]
Uemura

[11] Patent Number: 6,085,319
[45] Date of Patent: Jul. 4, 2000

[54] MICROCOMPUTER RESET APPARATUS AND METHOD

[75] Inventor: Toshiyuki Uemura, Hyogo, Japan

[73] Assignees: Mitsubishi Electric System LSI, Itami; Mitsubishi Denki Kabushiki Kaisha, Tokyo, both of Japan

[21] Appl. No.: 09/108,311

[22] Filed: Jul. 1, 1998

[30] Foreign Application Priority Data

Feb. 3, 1998 [JP] Japan .................................. 10-022402

[51] Int. Cl.⁷ ...................................................... G06F 1/24
[52] U.S. Cl. ................................................ 713/1; 714/23
[58] Field of Search .................................. 713/1; 714/23; 377/51, 107

[56] References Cited

U.S. PATENT DOCUMENTS

| | | | |
|---|---|---|---|
| 5,289,517 | 2/1994 | Ohba et al. | 377/44 |
| 5,440,603 | 8/1995 | Sugita | 377/20 |
| 5,864,663 | 1/1999 | Stolan | 714/55 |

FOREIGN PATENT DOCUMENTS

| | | |
|---|---|---|
| 62-131344 | 6/1987 | Japan . |
| 4-33117 | 2/1992 | Japan . |
| 7-6155 | 1/1995 | Japan . |

*Primary Examiner*—Thomas M. Heckler
*Attorney, Agent, or Firm*—Burns, Doane, Swecker & Mathis, LLP

[57] ABSTRACT

A microcomputer reset apparatus including a counter for counting pulses of a pulse signal generated by a ring oscillator, and an edge detector driven by a clock signal of the microcomputer, for detecting an edge of each pulse of the pulse signal to produce a reset signal of the counter. The edge detector halts its edge detection when the clock signal is suspended so that the reset signal of the counter is not produced. Thus, the count value of the counter overflows without being reset, and the microcomputer is reset by the overflow signal. This can solve a problem of a conventional microcomputer reset apparatus in that when its microcomputer operates normally, the microcomputer must regularly supply its 8-bit timer (counter) with a reset pulse to prevent the 8-bit timer from overflowing and producing the reset signal of the microcomputer, and that this increases the processing load of the microcomputer.

8 Claims, 5 Drawing Sheets

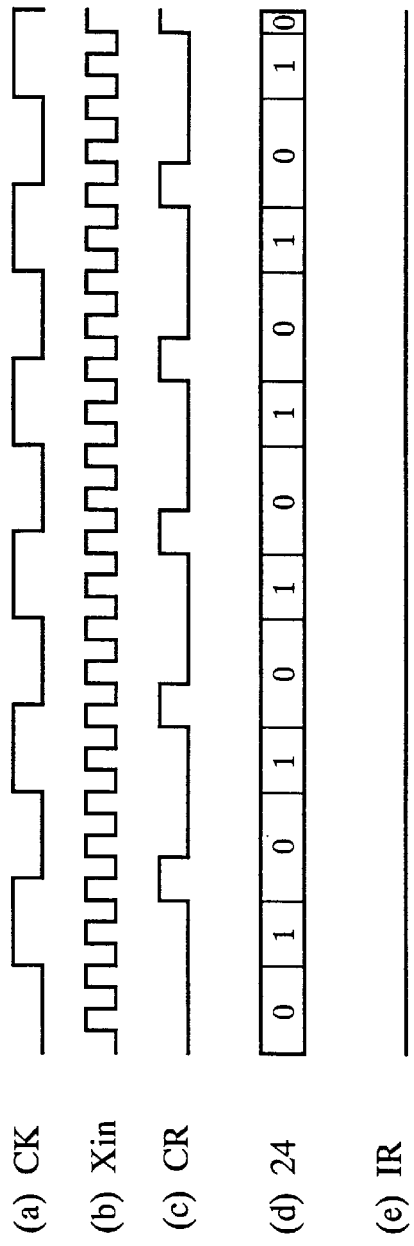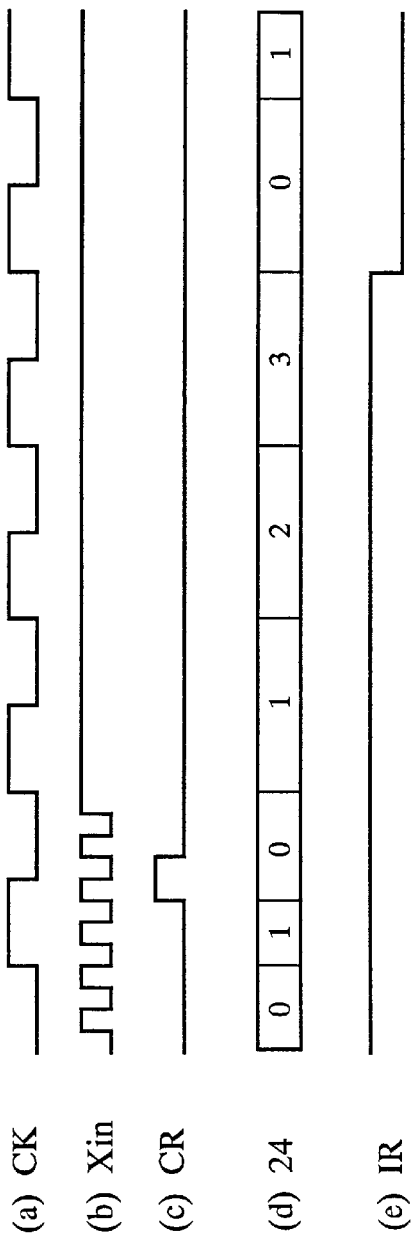

MICROCOMPUTER RESET APPARATUS AND METHOD

BACKGROUND OF THE INVENTION

1. Field of the Invention

The present invention relates to a microcomputer having a function of communicating with other microcomputers interconnected through a LAN (local area network), and particularly to a microcomputer reset apparatus and method for resetting the microcomputer when it suspends its operation.

2. Description of Related Art

FIG. 5 shows a configuration of a conventional microcomputer reset apparatus disclosed in Japanese patent application laid-open No. 4-33117/1992, for example. In FIG. 5, the reference numeral 1 designates an oscillator; 2 designates a clock generator connected with the oscillator 1 for generating a clock signal for driving a microcomputer 6; 3 designates a pulse generator for generating a pulse signal of a fixed period; 4 designates an 8-bit timer that increments its count value in response to pulses of the pulse signal supplied from the pulse generator 3, resets its count value in response to a reset pulse fed from the microcomputer 6, and produces an overflow signal when its count value reaches a predetermined value; 5 designates a reset signal generator for generating a reset signal in response to the overflow signal; and 6 designates the microcomputer that operates in synchronization with the clock signal, and is reset in response to the reset signal supplied from the reset signal generator 5.

FIG. 6 is a block diagram showing a configuration interconnecting a plurality of microcomputers 6 through a LAN, in which 7 designates a serial bus.

Next, the operation of the conventional microcomputer reset apparatus will be described.

The microcomputers 6 interconnected through the serial bus 7 can exchange data with any other microcomputers through the serial bus 7 if they have a communication function. However, if an accident like disconnection of the oscillator 1 takes place in one of the microcomputers 6 during its transmission of data, it halts its operation with supplying the serial bus 7 with a dominant level signal (H (high) level signal, for example), or a recessive level signal (L (low) level signal, for example).

If the microcomputer 6 halts its operation with outputting the L level signal, it will have little effect on the other microcomputers 6, enabling them to exchange data through the serial bus 7. On the contrary, if the microcomputer 6 halts its operation with outputting the H level signal, the communication from that time on becomes impossible because the signal level on the serial bus 7 is maintained at the H level and cannot be shifted to the L level, even if any other microcomputers 6 supply the serial bus 7 with the L level signal.

Therefore, if such an accident takes place, it is necessary for the microcomputer 6 to be reset so that the serial bus 7 is released from the state in which it is held by the H level signal. In view of this, the conventional microcomputer reset apparatus resets the microcomputer in the following procedure if such an accident takes place.

First, in the normal mode in which no accident like disconnection of the oscillator 1 occurs, the microcomputer 6 can operate in synchronization with the clock signal supplied from the clock generator 2. This enables the microcomputer 6 to regularly supply the 8-bit timer 4 with the reset pulse to reset it, which in turn prevents the 8-bit timer 4 from producing the overflow signal, and the reset signal generator 5 from supplying the microcomputer 6 with the reset signal.

In contrast with this, if an accident like disconnection of the oscillator 1 takes place, the clock generator 2 halts supplying the clock signal to the microcomputer 6. This will suspend the operation of the microcomputer 6, and hence it cannot supply the 8-bit timer 4 with the reset pulse. As a result, receiving the pulse signal from the pulse generator 3, the 8-bit timer 4 overflows, and supplies the reset signal generator 5 with the overflow signal. Thus, the reset signal generator 5 supplies the microcomputer 6 with the reset signal to reset it, thereby releasing the serial bus 7 from the state in which it is held by the H level signal.

With the foregoing configuration, the conventional microcomputer reset apparatus can reset the microcomputer 6 if its operation happens to be suspended by an accident like disconnection of the oscillator 1. The microcomputer 6, however, must regularly supply the 8-bit timer 4 with the reset pulse as long as it operates normally. This presents a problem of increasing its processing load.

Furthermore, depending on the processing of the microcomputer 6, even if the microcomputer 6 operates normally, a halt of the oscillator 1 can take place before the count value of the 8-bit timer 4 overflows. Depending on the signal level and timing of the halt, however, the microcomputer 6 continues to output the reset pulse. This presents another problem in that the reset signal generator 5 cannot produce the reset signal.

Still another problem arises in that quick processing steps cannot be taken after detecting the halt of the oscillator 1 because the reset pulse produced by the microcomputer 6 is used.

SUMMARY OF THE INVENTION

The present invention is implemented to solve the foregoing problems. It is therefore an object of the present invention to provide a microcomputer reset apparatus and method capable of resetting the microcomputer without increasing the processing load of the microcomputer when it halts its operation.

According to a first aspect of the present invention, there is provided a microcomputer reset apparatus for resetting a microcomputer driven by a clock signal, the microcomputer reset apparatus comprising: a pulse generator for generating a pulse signal; a counter for counting pulses of the pulse signal generated by the pulse generator, and produces an overflow signal when its count value reaches a predetermined value; an edge detector that is driven by the clock signal, detects at least one of a rising edge and falling edge of each pulse of the pulse signal generated by the pulse generator, outputs a reset signal of the counter in response to detection of the edge, and halts the detection of the edge while the clock signal is suspended; and a reset circuit for resetting the microcomputer in response to the overflow signal produced from the counter.

Here, the microcomputer may be interconnected with other microcomputers through a communications network.

The pulse generator may comprise a register for setting data enabling or disabling an operation of the pulse generator.

The pulse generator may halt generation of the pulse signal when the clock signal is suspended by an instruction of the microcomputer.

The pulse generator may comprise a circuit for changing a period of the pulse signal.

The edge detector may comprise a plurality of half latches connected in cascade.

The reset circuit may reset, if a reset signal is supplied externally, the microcomputer regardless of presence or absence of the overflow signal.

According to a second aspect of the present invention, there is provided a microcomputer reset method for resetting a microcomputer driven by a clock signal, the microcomputer reset method comprising the steps of: counting pulses of a pulse signal generated by a pulse generator, and produces an overflow signal when a count values reaches a predetermined value; detecting one of a rising edge or falling edge of each pulse of the pulse signal in synchronism with the clock signal; halting detection of the edge when the clock signal is suspended; and resetting the microcomputer in response to the overflow signal.

BRIEF DESCRIPTION OF THE DRAWINGS

FIGS. 4A and 4B are diagrams showing waveforms of various signals, wherein FIG. 4A illustrates the waveforms when an external oscillation signal is normally output, and FIG. 4B illustrates those when the external oscillation signal is halted;

DETAILED DESCRIPTION OF THE PREFERRED EMBODIMENTS

The invention will now be described with reference to the accompanying drawings.

EMBODIMENT 1

Figure 1:
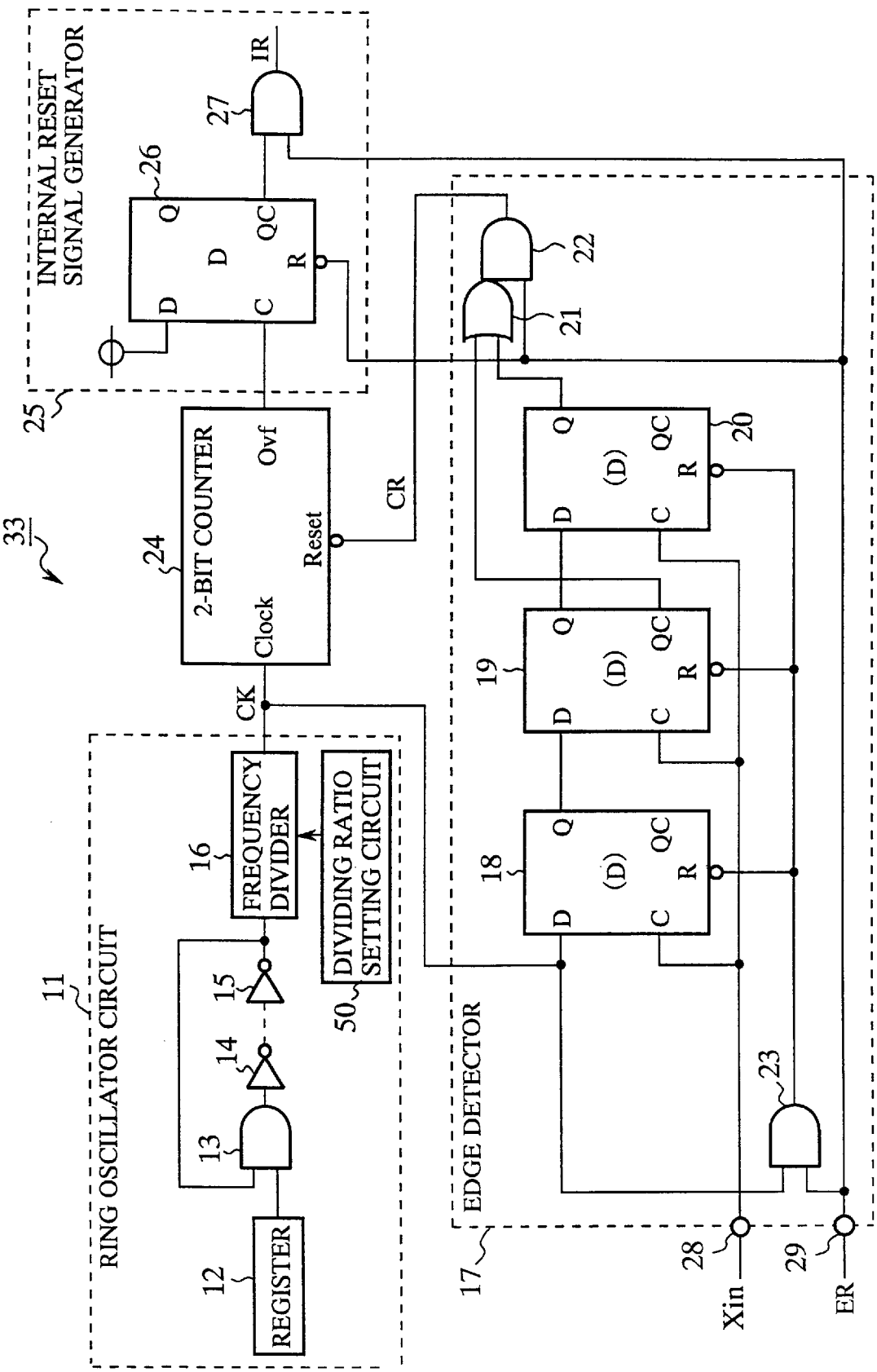
FIG. 1 is a block diagram showing a configuration of an embodiment 1 of a microcomputer reset apparatus in accordance with the present invention.

FIG. 1 is a block diagram showing a configuration of an embodiment 1 of a microcomputer reset apparatus in accordance with the present invention. In FIG. 1, the reference numeral 11 designates a ring oscillator circuit for generating a 2-bit counter clock signal CK (pulse signal); 12 designates a register for enabling or disabling the operation of the ring oscillator circuit 11; 13 designates an AND gate; 14 and 15 each designate an inverter for generating a relay time for generating the 2-bit counter clock signal CK; and 16 designates a frequency divider for generating the 2-bit counter clock signal CK of a fixed period, when the register 12 is set at the enable state to allow the operation of the ring oscillator circuit 11.

The reference numeral 17 designate an edge detector that operates in synchronism with an external oscillation signal Xin (clock signal) driving the microcomputer, and outputs a 2-bit counter reset signal CR when detecting a rising edge of the 2-bit counter clock signal CK generated by the ring oscillator circuit 11; 18, 19 and 20 each designate a half latch connected in cascade; 21 designates an OR gate with its first input terminal connected to the QC output terminal of the half latch 19, and its second input terminal connected to the Q output terminal of the half latch 20; 22 designates an AND gate with its first input terminal connected to the output terminal of the OR gate 21, and its second input terminal connected to an input terminal 29 of an external reset signal ER; and 23 designates an AND gate for resetting the half latches 18, 19 and 20 in response to the input of the external reset signal ER which is normally high and becomes low when resetting them.

The reference numeral 24 designates a 2-bit counter that increments its count value in response to the 2-bit counter clock signal CK generated by the ring oscillator circuit 11, resets the count value in response to the 2-bit counter reset signal CR supplied from the edge detector 17, and outputs an overflow signal Ovf when the count value becomes "3"; 25 designates an internal reset signal generator for producing an internal reset signal IR in response to the overflow signal Ovf output from the 2-bit counter 24; 26 designates a flip-flop; 27 designates an AND gate for resetting the microcomputer by outputting the internal reset signal IR in response to the signal fed from the QC output terminal of the flip-flop 26 or to the external reset signal ER; 28 designates an input terminal for inputting the external oscillation signal Xin; and 29 designates an input terminal of the external reset signal ER. Finally, the reference numeral 50 designates a dividing ratio setting circuit for changing the dividing ratio of the frequency divider 16, which will be described in an embodiment 4.

Figure 2:
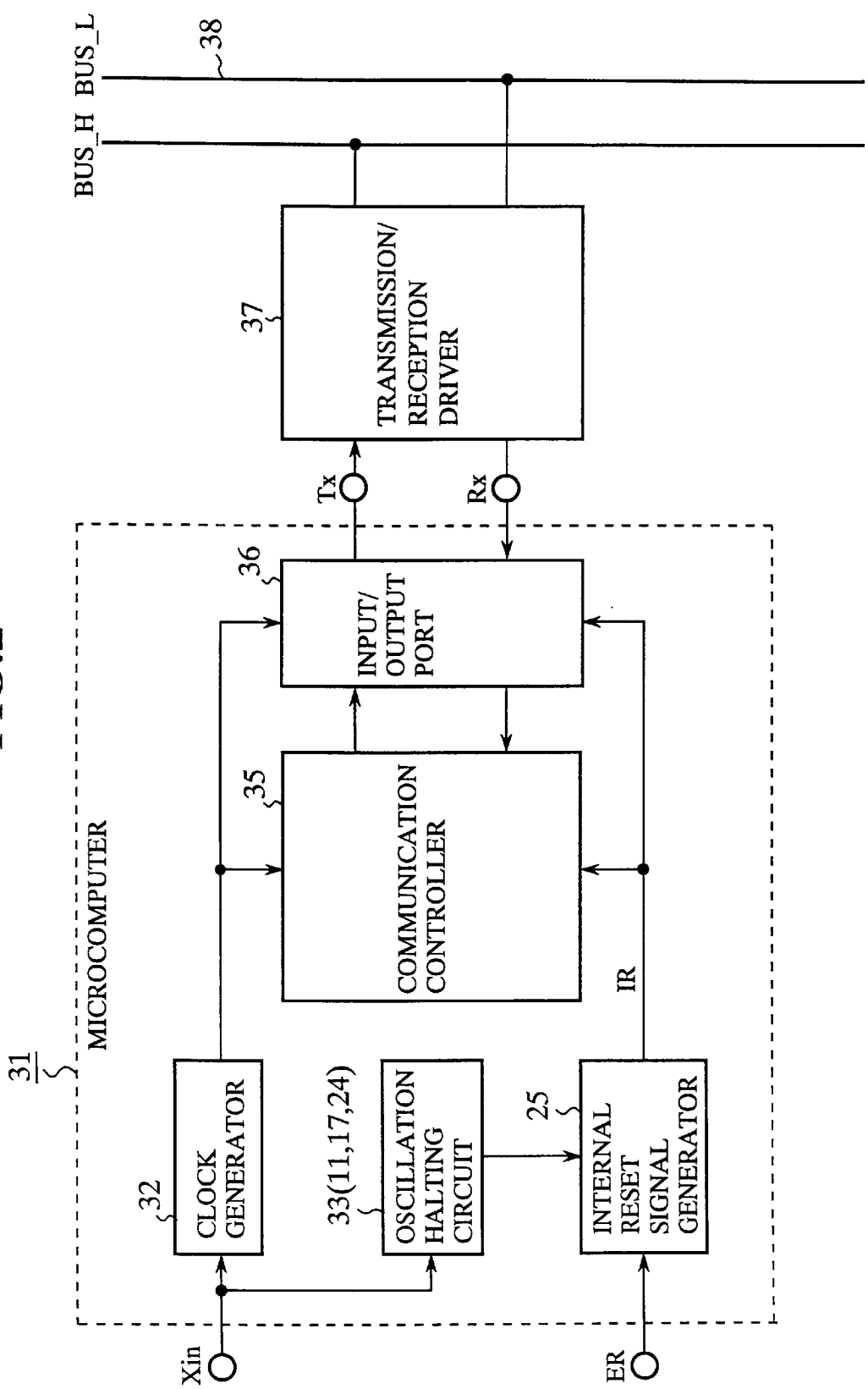
FIG. 2 is a block diagram showing a configuration in which the microcomputer is connected to a LAN.

FIG. 2 is a block diagram showing a configuration in which the microcomputer is connected to a LAN. The reference numeral 31 designates a microcomputer; 32 designates a clock generator for generating a system clock signal from the external oscillation signal Xin; 33 designates an oscillation halting circuit consisting of the ring oscillator circuit 11, edge detector 17 and 2-bit counter 24; 25 designates the internal reset signal generator consisting of the flip-flop 26 and the AND gate 27; 35 designates a communication controller for transmitting and receiving data in synchronism with the system clock signal; 36 designates an input/output port; 37 designates a transmission/reception driver; and 38 designates a serial bus.

Figure 3:
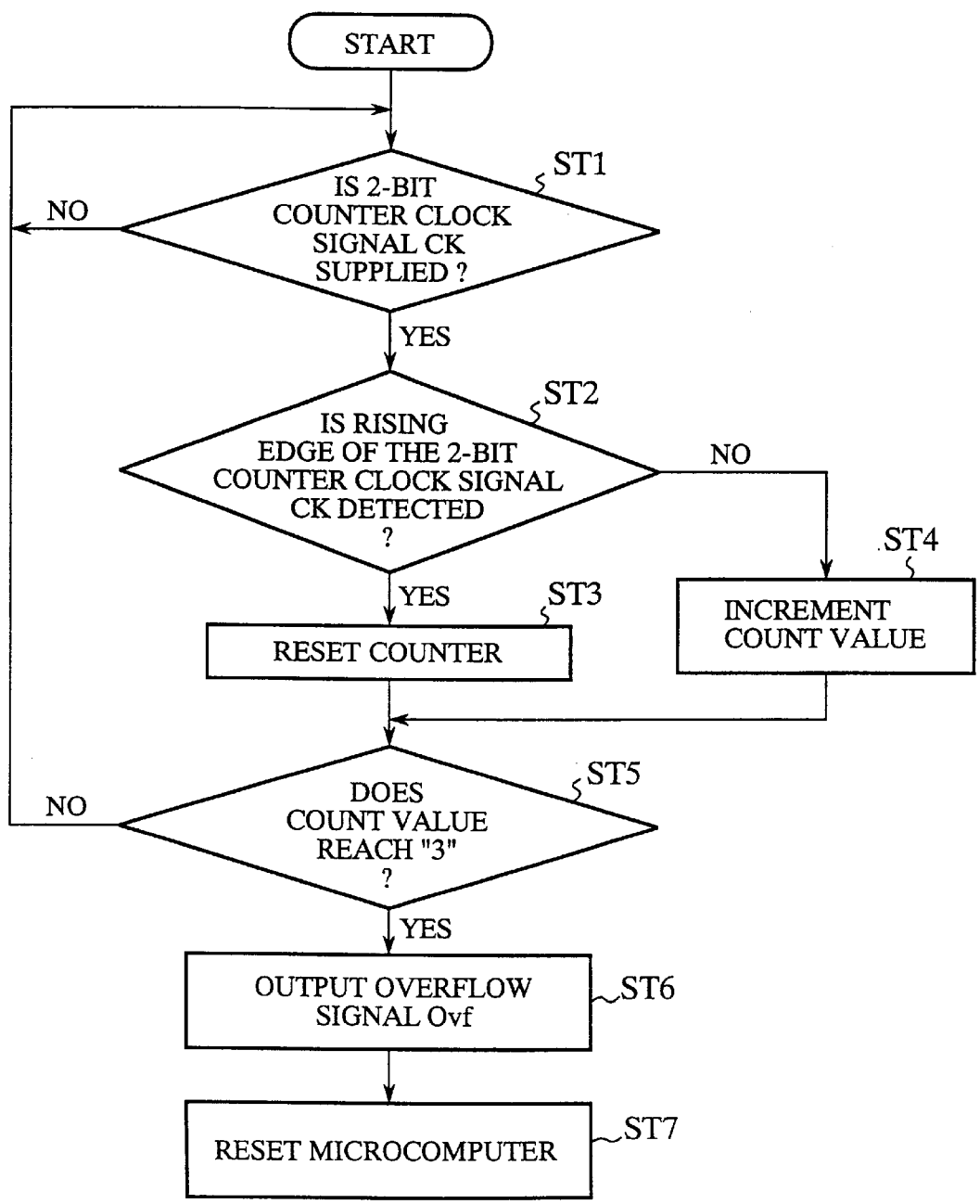
FIG. 3 is a flowchart illustrating a reset procedure of the embodiment 1 of the microcomputer in accordance with the present invention.
Figure 5:
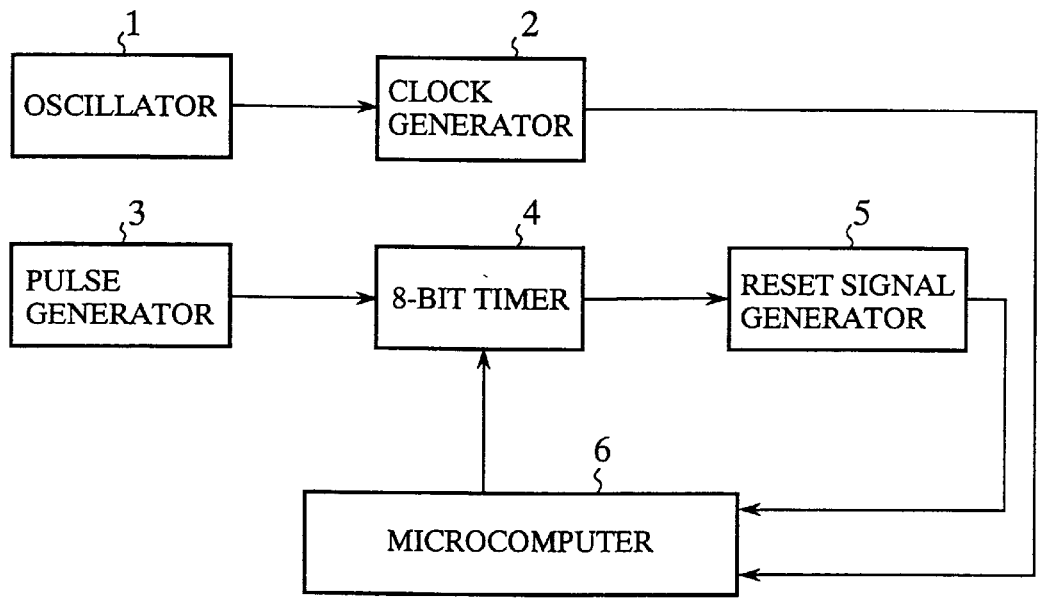
FIG. 5 is a block diagram showing a conventional microcomputer reset apparatus.
Figure 6:
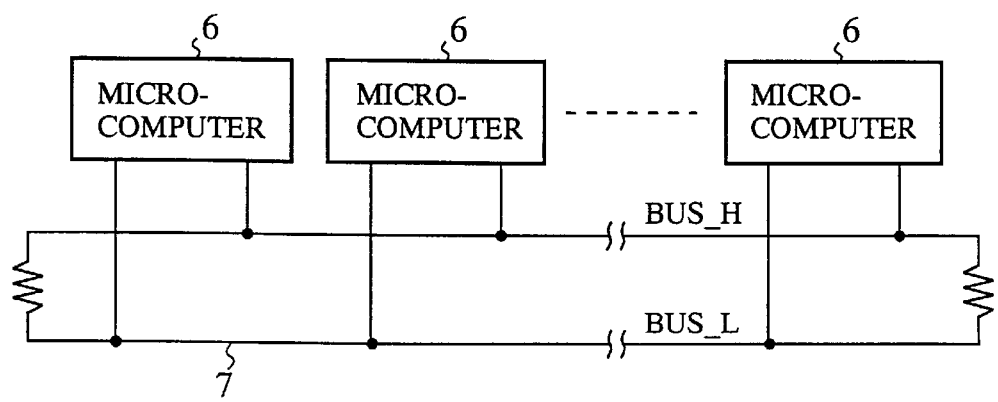
FIG. 6 is a block diagram showing a configuration in which a plurality of microcomputers are connected to a LAN.

Next, the operation of the present embodiment 1 will be described with reference to the flowchart shown in FIG. 3, which illustrates the reset procedure of the microcomputer 31 of the embodiment 1.

First, the normal operation will be described, in which the ring oscillator circuit 11 is enabled by setting at its register 12 the enabling data ("1", for example), and no accident has occurred such as the disconnection of an oscillator for oscillating the external oscillation signal Xin. The 2-bit counter 24 increments its count value each time the 2-bit counter clock signal CK is supplied from the ring oscillator circuit 11 (steps ST1, ST2 and ST4). In parallel with this, the edge detector 17 operates in synchronism with the external oscillation signal Xin which is supplied at the fixed period to the C terminals of the half latches 18, 19 and 20 of the edge detector 17 (see, FIG. 4A). Here, the frequency of the external oscillation signal Xin is twice or more that of the 2-bit counter clock signal CK.

In the course of this, since the signal levels at both the Q output terminal of the half latch 20 and QC output terminal of the half latch 19 become the L level at the second rising edge of the external oscillation signal Xin from each rising edge of the 2-bit counter clock signal CK supplied from the ring oscillator circuit 11, the AND gate 22 outputs the 2-bit counter reset signal CR (L level signal) through steps ST1, ST2 and ST3. Here, unless the external reset signal ER is input, the input terminal of the AND gate 22 connected with the input terminal 29 is maintained at the H level.

5

In this way, although the 2-bit counter 24 is incremented every time the 2-bit counter clock signal CK is input as shown in FIG. 4A, and becomes "1" (steps ST1, ST2 and ST4), it is reset to "0" when the 2-bit counter reset signal CR is supplied from the AND gate 22 of the edge detector 17 (steps ST1, ST2 and ST3).

Therefore, in the normal operation, in which no accident such as disconnection of the oscillator has occurred, the 2-bit counter 24 does not output the overflow signal Ovf. Accordingly, the flip-flop 26 does not output the reset signal, and hence the AND gate 27 does not output the internal reset signal IR.

Next, the operation in a failure will be described. It is assumed here that the enabling data (for example, "1") allowing the operation of the ring oscillator circuit 11 is set in its register 12, and an accident such as the disconnection of the oscillator for generating the external oscillation signal Xin has occurred to halt its oscillation. In this case, the 2-bit counter 24 increments its count value each time the 2-bit counter clock signal CK generated by the ring oscillator circuit 11 is supplied, as in the normal case described above (steps ST1, ST2 and ST4).

However, since the external oscillation signal Xin halts, and are not supplied to their C terminals, the half latches 18, 19 and 20 of the edge detector 17 stop their operation. Accordingly, the edge detector 17 does not output the 2-bit counter reset signal CR from its AND gate 22, and the signal level of the reset terminal of the 2-bit counter 24 is maintained at the H level.

Thus, the 2-bit counter 24 continues its up-count without being reset as shown in FIG. 4B, incrementing its count value each time the 2-bit counter clock signal CK is supplied thereto. Then, it outputs the overflow signal Ovf when it reaches the count value "3" (steps ST5 and ST6).

In response to the overflow signal Ovf, which is output from the 2-bit counter 24 when the external oscillation signal Xin halts owing to the accident like the disconnection of the oscillator, the internal reset signal generator 25 outputs the internal reset signal IR.

Then, internal reset signal IR resets the communication controller 35 and input/output port 36 of the microcomputer 31 (step ST7), releasing the serial bus 38 from the H level.

Incidentally, the microcomputer 31 can be reset forcedly as needed by applying the external reset signal ER because it causes the internal reset signal IR to be output from the AND gate 27 independently of the reset signal output from the flip-flop 26.

Furthermore, although the enabling data ("1", for example) is set in the register 12 to allow the operation of the ring oscillator circuit 11 in the present embodiment 1, the disabling data ("0", for example) can be set instead to inhibit its operation, thereby preventing the ring oscillator circuit 11 from outputting the 2-bit counter clock signal CK. This enables the current consumption to be reduced.

As described above, the present embodiment 1 is arranged such that it counts the 2-bit counter clock signal CK output from the ring oscillator circuit 11, resets the count value in response to the 2-bit counter reset signal CR output from the edge detector 17, and outputs the overflow signal Ovf when the count value reaches "3" without being reset. This offers an advantage of being able to reset the microcomputer 31 without increasing its processing load when its operation halts.

According to the present embodiment 1, since the edge detector 17 comprises the plurality of half latches 18–20 connected in cascade, the metastable can be avoided which can take place when transitions of the 2-bit counter clock signal CK generated by the ring oscillator circuit 11 and those of the clock signal driving the microcomputer occur at the same time from the L level to the H level or from the H level to the L level. This offers an advantage that the edge detector 17 can detect the rising edge or falling edge of the 2-bit counter clock signal CK without error.

EMBODIMENT 2

Although the foregoing embodiment 1 handles the case in which the edge detector 17 detects the rising edge of the 2-bit counter clock signal CK, it can detect the falling edge thereof, achieving the same effect as the embodiment 1.

EMBODIMENT 3

Although the foregoing embodiments 1 and 2 have the register 12 for setting the enabling or disabling data of the ring oscillator circuit 11, the register 12 is not essential to halt the operation of the ring oscillator circuit 11. For example, if the microcomputer has an instruction to halt the external oscillation signal Xin, it can stop the generation of the 2-bit counter clock signal CK using the instruction.

Thus, the microcomputer can reduce the current consumption by halting the generation of the 2-bit counter clock signal CK by the ring oscillator circuit 11, which can be applied to such a case where no monitoring of the microcomputer is required as when the microcomputer suspends its normal operation by halting the external oscillation signal Xin.

EMBODIMENT 4

Although the period of the 2-bit counter clock signal CK is fixed in the foregoing embodiments 1–3, it can be altered using the dividing ratio setting circuit 50 (see, FIG. 1) provided for changing the dividing ratio of the frequency divider 16.

This offers an advantage of being able to change the time period from the halt to reset of the microcomputer in accordance with its processing contents or a system configuration.

What is claimed is:

1. A microcomputer reset apparatus for resetting a microcomputer driven by a clock signal, said microcomputer reset apparatus comprising:

a pulse generator for generating a pulse signal;

a counter for counting pulses of the pulse signal generated by said pulse generator, and producing an overflow signal when its count value reaches a predetermined value;

an edge detector that is driven by the clock signal, detects at least one of a rising edge and falling edge of each pulse of the pulse signal generated by said pulse generator, outputs a reset signal of said counter in response to detection of the edge, and halts the detection of the edge while the clock signal is suspended; and a reset circuit for resetting said microcomputer in response to the overflow signal produced from said counter.

2. The microcomputer reset apparatus as claimed in claim 1, wherein said microcomputer is interconnected with other microcomputers through a communications network.

3. The microcomputer reset apparatus as claimed in claim 1, wherein said pulse generator comprises a register for setting data enabling or disabling an operation of said pulse generator.

4. The microcomputer reset apparatus as claimed in claim 1, wherein said pulse generator halts generation of the pulse signal when the clock signal is suspended by an instruction of said microcomputer.

5. The microcomputer reset apparatus as claimed in claim 1, wherein said pulse generator comprises a circuit for changing a period of the pulse signal.

6. The microcomputer reset apparatus as claimed in claim 1, wherein said edge detector comprises a plurality of half latches connected in cascade.

7. The microcomputer reset apparatus as claimed in claim 1, wherein said reset circuit resets, if a reset signal is supplied externally, said microcomputer regardless of presence or absence of the overflow signal.

8. A microcomputer reset method for resetting a microcomputer driven by a clock signal, said microcomputer reset method comprising the steps of:

counting pulses of a pulse signal generated by a pulse generator, and producing an overflow signal when a count values reaches a predetermined value;

detecting one of a rising edge or falling edge of each pulse of the pulse signal in synchronism with the clock signal;

halting detection of the edge when the clock signal is suspended; and resetting said microcomputer in response to the overflow signal.

* * * * *

UNITED STATES PATENT AND TRADEMARK OFFICE
CERTIFICATE OF CORRECTION

PATENT NO.   : 6,085,319
DATED        : July 4, 2000
INVENTOR(S)  : T. Uemura

It is certified that error appears in the above-identified patent and that said Letters Patent is hereby corrected as shown below:

Title page,
Item [73], Assignees, first Assignee should read -- Mitsubishi Electric System LSI Design Corporation --.

Signed and Sealed this

Ninth Day of May, 2006

JON W. DUDAS
*Director of the United States Patent and Trademark Office*